United States Patent

Tamura

[11] 4,063,813
[45] Dec. 20, 1977

[54] METHOD FOR EXPOSING A LIGHT SENSITIVE MEMBER

[75] Inventor: Yoshikazu Tamura, Ebina, Japan

[73] Assignee: Fuji Xerox Co., Ltd., Tokyo, Japan

[21] Appl. No.: 656,877

[22] Filed: Feb. 10, 1976

[30] Foreign Application Priority Data

July 24, 1976 Japan .................................. 51-89646

[51] Int. Cl.² ...................... G03B 27/32; G03B 27/54
[52] U.S. Cl. ......................................... 355/77; 355/67
[58] Field of Search ....................... 355/70, 71, 77, 69, 355/8, 67, 68; 354/126

[56] References Cited

U.S. PATENT DOCUMENTS

| | | |
|---|---|---|
| 2,036,447 | 4/1936 | Tuttle et al. ......................... 355/71 X |
| 3,224,327 | 12/1965 | Schulze .............................. 355/71 X |
| 3,262,356 | 7/1966 | Forbes ................................. 355/68 |
| 3,393,604 | 7/1968 | Lundin ................................. 355/68 |
| 3,679,306 | 7/1972 | Du Bois et al. ..................... 355/68 |
| 3,692,408 | 9/1972 | Nakamura ........................... 355/69 |
| 3,791,734 | 2/1974 | Mey .................................. 354/126 X |
| 3,832,057 | 8/1974 | Shogren ................................. 355/8 |

Primary Examiner—Donald A. Griffin
Attorney, Agent, or Firm—Gerald J. Ferguson, Jr.; Joseph J. Baker

[57] ABSTRACT

Method of exposing a light sensitive member with a discharge lamp energized by an alternating electrical current where the exposure time for each point on the light sensitive member is an integral multiple of the period of the periodic output variations of the discharge lamp. In the preferred embodiment, the exposure is effected through a slit where relative movement occurs between the slit and the light sensitive member and where $l = v \cdot n\ T_o$, $l$ being the width of the slit, $v$ being the relative velocity between the slit and light sensitive member, $T_o$ being the period of the periodic output variations of the discharge lamp and $n$ being any positive integer.

1 Claim, 4 Drawing Figures

METHOD FOR EXPOSING A LIGHT SENSITIVE MEMBER

BACKGROUND OF THE INVENTION

Field of the Invention

The present invention relates to an exposure method in an electronic copying machine or the like where a discharge lamp energized by an alternating electric current is used as a light source, and more particularly to an improved method for compensating for periodic variations, which occur in the exposure amount of a sensitive material or sensitive paper (hereinafter referred to as sensitive member) due to periodic output variations of the discharge lamp.

In an electronic copying machine or the like using an a-c discharge lamp as a light source, an a-c stabilizer for the discharge lamp is employed. Since the output of an a-c stabilizer for the discharge lamp is a periodic function, the output light intensity of the discharge lamp also varies in accordance with the periodic output variations of the stabilizer where FIG. 1 illustrates the periodic output variations of the discharge lamp, the frequency of the FIG. 1 signal being the same as the energizing alternating current for the distance lamp. Consequently, when exposing a sensitive member for copying purposes, the amount of exposure periodically varies in accordance with the periodic variations occurring in the output intensity of the discharge lamp. Thus, certain shortcomings tend to arise such as periodic fogging of the background of the copied image and periodic changes in the optical density of the image itself. Such phenomena tend to appear more conspicuous as the sensitive member scanning speed increases.

Although the above disadvantages are removable by means of high-frequency lighting or direct-current lighting, the former is not economically desirable as it requires a special power source or a high-frequency converter, while the latter is inferior in overall efficiency and tends to introduce a problem of darkening.

SUMMARY OF THE INVENTION

The present invention lessens, if not eliminates, the above disadvantages, and has its primary object the provision of an improved exposure method in a copying machine or the like where a discharge lamp is energized by a commerical a-c power source or the like. In the preferred embodiment, when effecting a slit exposure by the discharge lamp, the exposure time is an integral multiple of the period of the periodic output variations of the discharge lamp to thereby achieve uniform exposure at every point in the scanning direction of a sensitive member.

Other objects and advantages of this invention will be apparent from the reading of the following specification and claims taken with the drawing.

DETAILED DESCRIPTION OF PREFERRED EMBODIMENT OF THE INVENTION

Figures 3A, 3B:
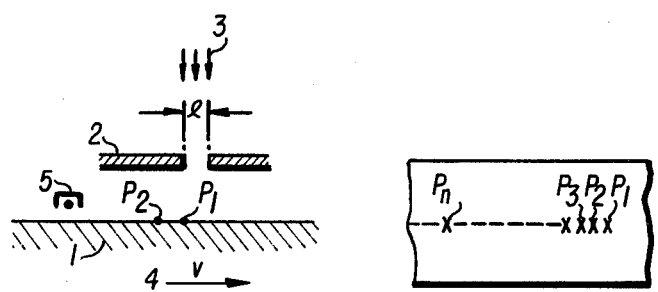
FIG. 3(A) is a cross-section side view of an illustrative slit and sensitive member further illustrating the principle of the present invention.
FIG. 3(B) is a plan view of the sensitive member of FIG. 3(A).

Generally, the exposure amount of a sensitive member is determined by light intensity and an exposure time. That is, the value obtained by integrating the periodic variation function of the output light intensity with respect to the exposure time length is the exposure amount, which is represented by the following equation.

$$I = \int_{t}^{t+T} I(t)dt \tag{1}$$

where
I(t): Periodic function of output light
T: Exposure time
t: Exposure start moment at one point on sensitive member From Equation (1), the exposure amounts $IP_1, IP_2 \ldots IP_n$ at points $P_1, P_2 \ldots P_n$ in FIG. 3(B) are represented by the following equations.

$$IP_1 = \int_{t_1}^{t_1+T} I(t)dt \tag{2}$$

$$IP_2 = \int_{t_2}^{t_2+T} I(t)dt \tag{3}$$

$$IP_n = \int_{t_n}^{t_n+T} I(t)dt \tag{4}$$

When the exposure start moments with respect to a certain exposure time are in the relation $$t_i = t_1 + m \cdot To$$

$$t_j = t_2 = n \cdot To$$

then the exposure amounts are always $$IP_1 = IP_i$$

$$IP_2 = IP_j$$

but they are not always $$IP_1 = IP_2$$

where
$t_i, t_j$: Exposure start moments at points $P_i$ and $P_j$ on sensitive member
$IP_i, IP_j$: Exposure amounts at points $P_i$ and $P_j$
To: Period of output light periodic function
m, n : Integers Consequently, the exposure amount varies depending on the period To.

If the exposure time T is set to an integral multiple of the period To of I(t), then
i: $I(t) = I(t + T)$
ii: From (I), $$\int_{t_1}^{t_2} I(t)dt = \int_{t_1+T}^{t_2+T} I(t)dt$$

iii: Exposure amount $IP_2$ at point $P_2$ is expressed as $$IP_2 = \int_{t_2}^{t_2 + T} I(t)dt$$

Supposing now $t_2 = t_1 - \Delta t$ $$IP_2 = \int_{t_1 + \Delta t}^{t_1 + \Delta t + T} I(t)dt$$
$$= \int_{t_1}^{t_1 + T} I(t)dt + \int_{t_1 + T}^{t_1 + \Delta t + T} I(t)dt - \int_{t_1}^{t_1 + \Delta t} I(t)dt$$

(iv) From (ii),
$$\int_{t_1}^{t_1 + \Delta t} I(t)dt = \int_{t_1 + T}^{t_1 + \Delta t + T} I(t)dt$$

(v) From (iv),
$$IP_2 = \int_{t_1}^{t_1 + T} I(t)dt + IP_1$$

Accordingly, the shifts of $\Delta t$ or the exposure amounts at points $P_2, P_3 \ldots P_n$ are expressed as $$IP_1 = IP_2 = \ldots = IP_n$$

In this manner, regardless of periodic variations occurring in the output light of the discharge lamp, setting the exposure time to an integral multiple of the period renders it possible to attain a uniform exposure amount at every point in the scanning direction of the sensitive member.

Therefore, in FIG. 3(A) where the relative speed between a sensitive member 1 and an exposure slit in a shield member 2 is labeled v and the slit width as $l$, $v$ and $l$ may be selected so that the time for any point $P_n$ to pass the slit or, in other words, the exposure time (T = $l/v$) is an integral multiple of the period To of the periodic output variations of the discharge lamp where the light from the lamp is indicated at 3 and a charger is indicated at 5.

Figure 1:
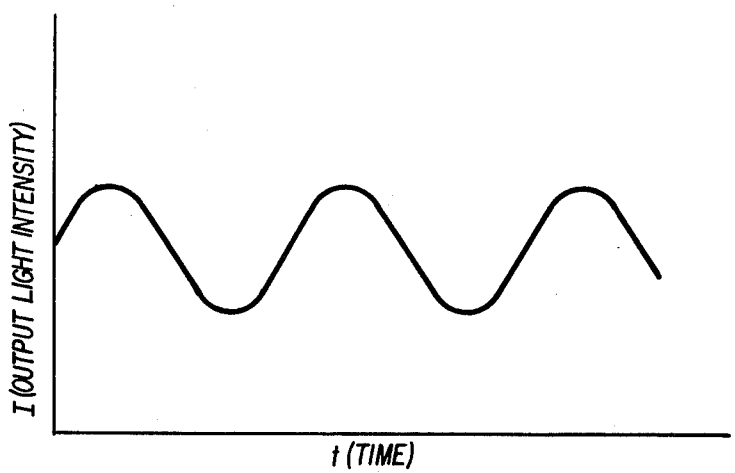
FIG. 1 shows variations in the output light intensity of a discharge lamp with respect to time.
Figure 2:
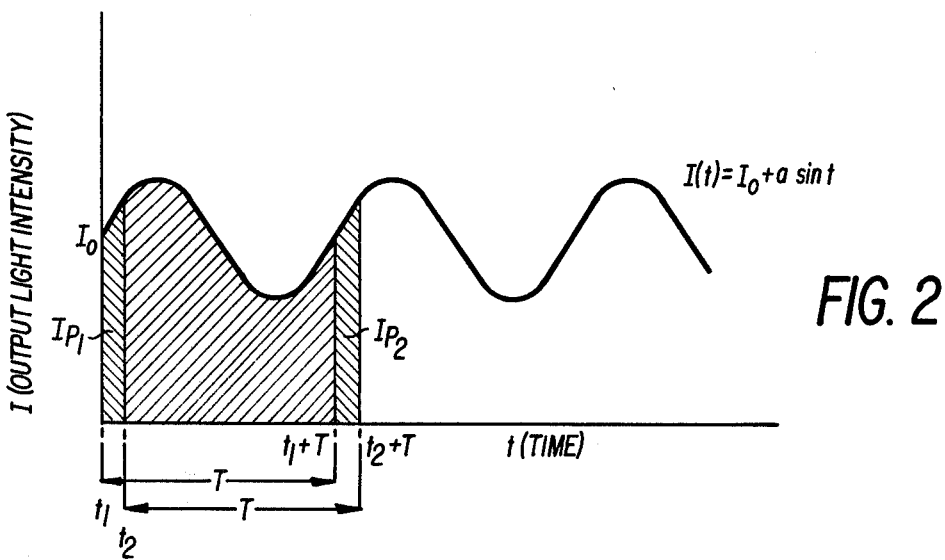
FIG. 2 is a graph illustrating the principle of the present invention.

Referring now to an exemplary embodiment where the output light intensity of the discharge lamp is a sine wave as illustrated in FIG. 2, assume $$I(t) = Io + a \sin t$$
Exposure time T = $2\pi$ From Equations (1) and (2), the exposure amounts $IP_1$ and $IP_2$ (FIG. 2) at two points $P_1$ and $P_2$ (FIG. 3) in a main scanning direction on the sensitive member are given by $$IP_1 = \int_{t_1}^{t_1 + T} (Io + a \sin t)dt = 2\pi Io$$
$$IP_2 = \int_{t_2}^{t_2 + T} (Io + a \sin t)dt = 2\pi Io$$

Accordingly, the slit width $l$ of shield member 2 shown in FIG. 3(A) is obtained from the following equation in relation to sensitive member scanning speed v and the exposure time T.

$l = v \cdot T = 2\pi v$  In general, the slit width $l = v \cdot n$ To
where $n$ is any positive integer.

In the present invention, as described in detail above, the exposure time is an integral multiple of the period of the periodic output variations of a discharge lamp energized by an alternating current. Thus, the periodic variations in a scanning direction on a sensitive member are eliminated to achieve a uniform exposure amount, thereby preventing fogging of the background of a copied image and further preventing periodic changes in the optical density of the image. Also, the method of the present invention can be carried into effect easily by a relatively simple device at a low cost.

What is claimed is:

1. A method of exposing a light sensitive member with a discharge lamp energized by an alternating electrical current; said method comprising substantially exposing each point on the light sensitive member for a length of time substantially equal to an integral multiple of the period of the periodic output variations of the discharge lamp by relatively moving a shield member having a slit therein with respect to said light sensitive member where $l = v \cdot n$ To and
  $l = $ the width of the slit
  $v = $ the relative velocity between the shield member and the light sensitive member
  To $= $ the period of said periodic output variations of the discharge lamp; and
  $n = $ any positive integer.

* * * * *